US008959365B2

(12) United States Patent
Lewak

(10) Patent No.: US 8,959,365 B2
(45) Date of Patent: Feb. 17, 2015

(54) METHODS OF PROVIDING FAST SEARCH, ANALYSIS, AND DATA RETRIEVAL OF ENCRYPTED DATA WITHOUT DECRYPTION

(71) Applicant: Jerzy Lewak, Del Mar, CA (US)

(72) Inventor: Jerzy Lewak, Del Mar, CA (US)

(73) Assignee: SpeedTrack, Inc., Yorba Linda, CA (US)

( * ) Notice: Subject to any disclaimer, the term of this patent is extended or adjusted under 35 U.S.C. 154(b) by 32 days.

(21) Appl. No.: 13/933,085

(22) Filed: Jul. 1, 2013

(65) Prior Publication Data

US 2014/0019776 A1 Jan. 16, 2014

Related U.S. Application Data

(60) Provisional application No. 61/666,917, filed on Jul. 1, 2012.

(51) Int. Cl.
*G06F 21/62* (2013.01)
(52) U.S. Cl.
CPC .................................. *G06F 21/6227* (2013.01)
USPC ............................... 713/193; 726/22; 380/28
(58) Field of Classification Search
CPC ................................................. G06F 2162/27
USPC ............ 713/193–197; 726/22–27; 380/28–30
See application file for complete search history.

(56) References Cited

U.S. PATENT DOCUMENTS

| | | | | |
|---|---|---|---|---|
| 4,383,323 A * | 5/1983 | Timor | .......................... | 375/135 |
| 4,591,673 A * | 5/1986 | Lee et al. | ......................... | 380/28 |
| 7,043,755 B1 * | 5/2006 | Roger et al. | ..................... | 726/22 |
| 7,283,628 B2 * | 10/2007 | Stein et al. | ...................... | 380/29 |
| 7,441,122 B2 * | 10/2008 | Plagne | .......................... | 713/182 |
| 7,593,525 B1 * | 9/2009 | Gallagher, III | .................. | 380/28 |
| 7,603,461 B2 * | 10/2009 | Crosby et al. | ................. | 709/224 |
| 7,865,218 B2 * | 1/2011 | Iguchi et al. | ................... | 455/574 |
| 8,102,997 B2 * | 1/2012 | Teglia et al. | .................... | 380/29 |
| 8,175,265 B2 * | 5/2012 | Ciet et al. | ........................ | 380/29 |
| 8,417,502 B1 * | 4/2013 | Anati et al. | ..................... | 703/13 |
| 8,634,553 B2 * | 1/2014 | Hata et al. | ....................... | 380/44 |
| 8,666,065 B2 * | 3/2014 | Zuili | .............................. | 380/28 |

* cited by examiner

*Primary Examiner* — Haresh N Patel
(74) *Attorney, Agent, or Firm* — Klein, O'Neill & Singh, LLP

(57) ABSTRACT

Methods and systems of providing remote coded data storage, data analysis, and search and retrieval, with assurance of data security are described. Data security is such that it protects the data from any provider, administrator of remote services, or anyone breaking into the servers housing the data at the remote site. The methods include a coding schema such that both the storage and the associated services, such as data analysis, search and retrieval, can be provided even more efficiently and more responsively than without the coding. Possible applications of the methods include data storage, powerful data search and analysis services which can all be provided "in the Cloud" over the Internet, completely securely, even when a customer's private data set needs to be uploaded to the remote site. The efficiency of analysis, and search means that the methods may be useful even when security of data is not an issue.

7 Claims, 5 Drawing Sheets

METHODS OF PROVIDING FAST SEARCH, ANALYSIS, AND DATA RETRIEVAL OF ENCRYPTED DATA WITHOUT DECRYPTION

CROSS REFERENCE TO RELATED APPLICATIONS

This application claims the benefit of the filing date of U.S. Provisional Application No. 61/666,917, filed Jul. 1, 2012, entitled "Methods of Providing Fast Search, Analysis, and Data Retrieval of Encrypted Data Without Decryption" the disclosure of which is incorporated by reference.

BACKGROUND OF THE INVENTION

The present invention relates generally to data security, and more particularly to data coding or encryption.

Providing Cloud services for private data searches, data mining, data extraction, and other data analysis tasks, requires keeping the data private. The standard way to keep data private is to encrypt it. However encrypted data has to be decrypted during searches, slowing the process of searching and data analysis, and providing an opportunity for a break-in compromising the data.

Several different methods of encrypting data and reducing the resulting hit on search performance have been proposed.

BRIEF SUMMARY OF THE INVENTION

One aspect of the invention provides a computer implemented method of providing secure data storage, the data comprised of data items which are comprised of data components, a plurality of the data components being comprised of a plurality of text characters, the method comprising: coding at least all data components needing secure storage such that each unique data component of a plurality of data components is assigned a unique code unrelated to the semantic meaning of the data component; storing the data using the coded data components; ensuring that decoding a coded data components is not needed to search for it; ensuring that to replace each code with a corresponding data component requires a table with at least as many code entries as there are codes used.

Another aspect of the invention provides a computer implemented method of providing data storage and search services, using a client-server system, in which a client computer is in a first location and a server computer is in a second location, the database comprised of data items which are comprised of data components, the method comprising: choosing a plural set of data components for coding in the first location; assigning a number code to each of the chosen data components in the first location; assigning identifiers to each of a plurality of data items in the first location; in the first location, creating a code table for converting each coded data component's assigned number code to the data component, such that the number code is arithmetically related to the number of the table row which contains the data component; and storing the number codes at the second location; wherein the code table is stored in a location other than the second location.

Another aspect of the invention provides a computer implemented method of providing access to data items in a collection of data items, using a client-server system in which a client is in a first location and a server is in a second location, the method comprising: in the first location identifying data components of data items, a plurality of data components comprising character strings consisting of more than two characters; in the first location assigning a number code to identify each of a plurality of data components and an identifier to each of a plurality of data items; in the first location creating a code table in which each row number is arithmetically related to the code of a data component and the corresponding table cell contains the data component or a reference to the data component; storing information indicative of the number codes in the second location; and in the second location performing a search of data items matching a Boolean query comprised of number codes of data components with the code table stored in a location other than the second location.

Another aspect of the invention provides a computer implemented method of coding data by assigning whole number codes to data components of data items, the method comprising: accepting input of a data component; comparing the data component to other data components that have already been coded; assigning a whole number code to the data component; storing the data component and its code; performing a search for a data component without decoding the data and without adding any performance overhead as compared with searches through uncoded data.

Another aspect of the invention provides a method of storing, searching and retrieving data such that the stored data is coded and remains coded at all times during the searching, retrieving and the searching is performed faster compared to the search through the same uncoded data. In some such aspects the searches and retrieval of the coded data are performed at a first location and the retrieved data is decoded at a second location. In some such aspects a client computer program is located at the second location and a server computer program is located at the first location.

These and other aspects of the invention are more fully comprehended upon review of this disclosure.

DETAILED DESCRIPTION

The methods described here replace each word, phrase or other data component in the data with a code, preferably a whole number code. Data moved to a server, accessible over a network, for example the Internet is entirely in terms of the codes, and the server may be considered a Cloud server. Search terms entered by a user or client software are converted to respective codes and the coded query is sent to the server. Searches are carried out by matching the codes of the query with the codes of the data, without the need for translation. This has the advantage of keeping the data private and an additional advantage that searches are more efficient so responses are faster than if text were used instead of number codes.

A table, or multiple tables relating number codes to text, identifiers of data components, or their locations, is the key needed for decoding the results. This key can easily fit on a flash plug and can itself be password protected. Such an arrangement concentrates security control on the key which can be kept under the data owner's control.

Figure 1:
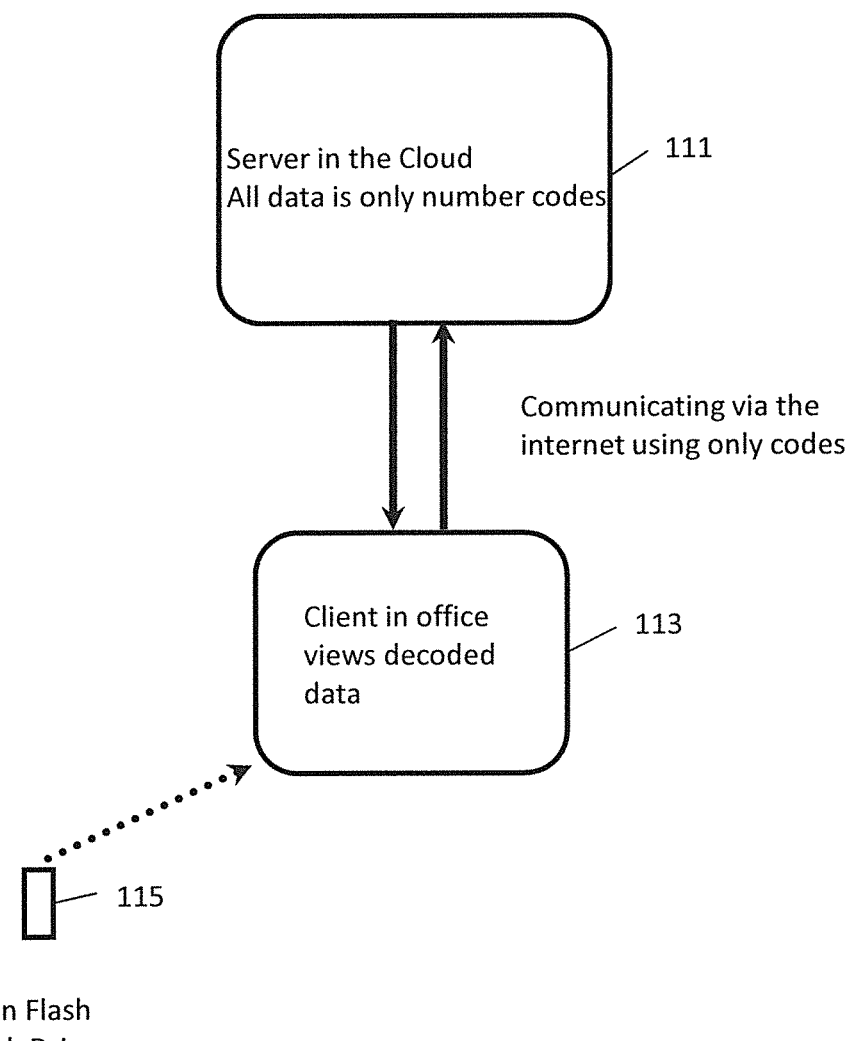
FIG. 1 is a block diagram of a client-server arrangement in accordance with aspects of the invention.

An example of a client server arrangement in accordance with aspects of the invention is illustrated in FIG. 1. A server 111 maintains data, with the data coded as numbers. A client 113 communicates with the server over a network, for example the Internet. The client sends queries to the server using the codes of data components, and receives responses to queries. The client may request data from the server, in which case the server returns the data coded as numbers. The client decodes the data using a key, which may be stored on a portable memory device 115, for example.

Coding of Data

In computers everything is a number. In particular, the atoms of text are characters and each character is coded as a whole number. This has been the practice since the start of computers.

In many applications, using today's computers, it is more convenient to code larger data components, such as commonly occurring text character combinations, punctuation marks, words, phrases, sentences, as also every graphic, movie, music, sound, or other element. We will refer to these as data components. Each component can be coded as a whole number. Each identifiable attribute of a text or a non-text component can be similarly coded. In documents containing graphics, attributes of each graphic can be coded and/or the graphic itself can be assigned a number. Some of these codes can reference the component indirectly, for example by its location, while others can directly reference the component. Examples of attributes of graphics are graphic size, type (drawing, picture, color or black and white etc.) date created, and any other attributes that can be useful when searching, and similarly for other data components. Considering the example of FIG. 1, in many embodiments components, which in various embodiments include text character combinations and/or attributes of graphics, are coded as whole numbers, with the numbers, being considered number codes, stored in storage associated with the server 111. Communication between the server and the client 113 is of the number codes, and not the data components. A key, for example stored on a portable memory device such as a thumb drive 115, which is not located with or accessible by the sever, relates the number codes to the data components and/or items.

Applications of Coding

Applications of this method of coding include data stores of all kinds, such as for example data records in a database or files on disk. A computer operating system can also use these methods to facilitate locating information in files and additionally provide security of data storage and protection against a break-in to the computer. Such protection can be possible if all communication of other computers, with the operating system on the protected computer, is similarly coded. Applications which create files, such as word processors, spreadsheets, etc. can also usefully use the methods described here to store the coded files on disk and so protected from anyone who does not use the decoding table.

Using the system to encrypt emails can provide secure email. For emails the initial coded vocabulary can be the initial key. This initial key can also include codes for every text character or more generally a character tuple. When a new word is used by any correspondent, these tuple codes can be used to code it. Thus the coded word can be sent to each correspondent and the word code can be added to the key on each user's computer. When two correspondents each need the same new word when corresponding with others, the same word can be assigned multiple codes.

There are several ways to handle such situations. One way is to use a server which manages coordination of the vocabulary. Each user's coded email application can automatically notify the server of any changes in the vocabulary and the server can update all users of the codes. Another method can arrange to send, in an email, all changes of the coding key, that are new to a correspondent. All additions to the coding key can be performed entirely in terms of codes indicating the translation of each character code combination to a new code number.

We describe in detail the advantages of such whole number coding in the context of a database application as an example. Other applications should be evident from these descriptions. The preferred method is based on using whole number codes for every data component, so that each occurrence of a coded data component is replaced by its whole number code and all processing of the text is performed using these codes. An immediately clear advantage is that indexing of such data components is much more efficient. Another advantage is that access to a particular data component code to determine its meaning can be extremely fast if an array is used in such a way that the code number is the index of the array or is arithmetically related to the array index at which the value is the data component.

Although whole number codes are assumed in this description, any other codes, whether numbers or character combinations, can be used instead. For example, there may be occasions where decimal numbers can be conveniently used. The whole number portion of the decimal can be related to the array index and the decimal portion can be used to code other dimensions of the components, such as the type of component.

One way of coding every data component is to associate the code directly with the data component, when the data component is textual, or with a reference to the location of the data component when it is non-textual. The assignment can use formulas or can be arbitrary. The use of formulas however is not as safe as when it is arbitrary and requires a table of codes. The safest coding table is one in which the only relationship between the codes and the data components is defined by the table and the order of assignment can be arranged to be totally arbitrary, or random. Such a table can be considered the "key to the data" just like a single password or code, but one that is much harder, or even impossible to break.

The frequency of occurrence of data components within the data may be a target of code breaking attempts if the subject domain of the data is known in some detail. To avoid this possibility, the coding can use multiple codes for each of the more frequently used data components, thus obscuring the true frequencies of use.

Data can be stored, quite securely, encrypted using any of the well-known encryption methods. However, the decryption during search provides an opportunity for "spying eyes" to compromise security and the decryption time slows down performance. Several attempts at overcoming this problem have been made. One recent such method called CryptDB claims an overhead of between 14.5% and 26% compared to the unencrypted case, providing a substantial overhead to performance or throughput. This is claimed as a great improvement over anything previously available. Generally, the methods described here not only do not add an overhead, they greatly enhance performance, effectively reducing query response times.

Coding Vs Encrypting

We use the term "coding" of data components to mean replacing the data components by codes, each of which contains no information related to the data component, other than the relation provided by the key.

Encrypting is usually understood to mean the coding of all data components using a single schema based on a single password of reasonable length and based on the textual content of each part of text. This means the result of encryption contains within it the information contained in the encrypted text. In contrast the number coding schema described here should be seen as a text independent encryption of each data component. This means that the codes do not contain with them any information present in the text they represent. The connection to the meaning of each code is outside and independent of the code itself, and is provided by the key. That information resides in the coding table (or key) alone. Such a schema can make the breaking of the codes either totally impractical, or impossible, even when a very large corpus of coded data is stolen.

Database Example

If the text data in a database is stored using a whole number code for each word, phrase, punctuation mark, special symbol and/or sentence, it can increase the speed of searching and provide safe coding and storage of the data. Normal text searches find matching words by checking the match of each text character in each word. Searching for a whole number code representing a word needs only to check the match of one number. In English text, for example, the average word length is about 5 characters, each of which, in two-byte unicode, uses 2 bytes. In most databases the total number of needed data components, mostly words, will certainly not exceed the limit of a 4 byte number (4,294,967,295). Searching for each word is equivalent to finding a match to a 4 byte number. That alone means a saving in search time.

However, a much greater time saving can be achieved because the search Boolean can be expressed in terms of whole number codes. As a user enters a search term, it is converted to its number code which also determines that it exists in the code table, and is used in the query, thereby expressing the query in terms of number codes and Booleans. Fast searches for data items containing data components, involve locating a whole number code corresponding to a data component and can be carried out using a location index table, also called an association matrix, storing all the IDs of data items containing each data component. One way of storing an association matrix uses a bitmap, or array of bit vectors. Each row number of the matrix is the ID of a data component and each column number is the ID of a data record or a data item which could be a join of records. In this bitmap, or binary version of the association matrix, a 1 in a cell in column C and row R represents the presence of the data component with ID number C, in the data item with ID number R, representing the presence of an association between the data component C and data item R. Conversely, a zero in that cell represents no association between the respective parts. Such a binary storage arrangement is quite often a very sparse matrix, in which the great majority of the cells are zeros. This means that its storage space requirements are much larger than they need be. Table 1 illustrates a bitmap representation of the association matrix with a simple example. Each row in such a table is of fixed length and the row is represented by a data component bit vector, with the number of bits equal to the total number of data items.

To take advantage of this sparseness, some or all vectors of an association matrix can often be more optimally stored as an array of data component vectors, where each vector component is the ID of a data item associated with the component. This representation of the association matrix is referred to as the ID Vector representation. Table 2 shows the example from Table 1, represented as an array of ID Vectors or Rows, each of which in this kind of table can have a different length, the length of each data component vector being the count of data items associated with the data component. In estimating storage sizes, we use the average number of data items per data component.

In both the bitmap and the ID Vector representations, locating a target whole number code does not need a search for any matches, because the target whole number code is the array index in the association matrix. This array index is related by the compiler simply arithmetically to the address of the respective row vector. The components of each row vector in this association matrix are the identifiers of all the data items containing or associated with the respective data component.

TABLE 1

Association matrix bitmap representation

| row number = array index = ID of data component | Column number = ID of each data item | | | | | |
| --- | --- | --- | --- | --- | --- | --- |
| | 1 | 2 | 3 | 4 | 5 | 6 |
| 0 | 1 | 1 | 1 | 1 | 0 | 0 |
| 1 | 0 | 0 | 1 | 0 | 1 | 0 |
| 2 | 0 | 0 | 1 | 1 | 0 | 1 |
| 3 | 1 | 1 | 0 | 0 | 1 | 0 |

TABLE 2

Association matrix ID vector representation

| row number = array index = ID of data component | ID of associated data item | ID of associated data item | ID of associated data item | ID of associated data item |
| --- | --- | --- | --- | --- |
| 0 | 1 | 3 | 4 | 2 |
| 1 | 5 | 3 | | |
| 2 | 6 | 4 | 3 | |
| 3 | 1 | 2 | 5 | |

The storage space required for such a matrix table, even for very large databases, is quite easily accommodated in current computers. For example the number of unique data components in a large database, of mostly text data items, can be as large as 10 million. If the average number of data items associated with a data component is about 500, the space required to store the matrix can be about 20 GB, assuming that we use 4 bytes to store each ID. Such matrices can be held on disk, or in RAM. Disk access can be very fast because searching for matching items needs to access only one vector, for each data component comprising a query. For even faster access, RAM (or flash RAM) can accommodate such indexes.

The most efficient structure for the association matrix can use an array of vectors of two types. Sparse vectors can be stored as ID vectors while the more dense ones can be stored as bit or binary vectors. For example, if 32 bit numbers are used for IDs, then when the density of bits in a bit vector representation is less than or equal to 1 in 32, the bitmap representation can be used. For other densities, the ID number representation can be used. The first element of each vector can represent its type.

Remote Data Storage

There are additional advantages of such data component indexing, particularly when searches are to be carried out on a remote computer. An important consideration in today's markets is the security of data storage "in the Cloud," or stored in storage available over a network, generally the Internet. We will refer to this and other similar arrangements as remotely stored data.

Although security of such remotely stored data is improving, breaches have occurred in the past and will occur in the future despite best efforts. Using the method of coding data components and then for remote data storage, storing all data only in terms of the whole number codes, can provide better security. Anyone breaking in to the data storage location will not be able to extract any information from the data without having access to the meaning of each code, that is access to the code table.

The coding table stores the meaning of every whole number code. This is all that needs to be secured and can be stored on the client side, not on the remote computer. It is then up to the user to provide security for the coding table. In case of a break-in to the remote computer, the codes are of no use without the coding table. The coding table is quite small in comparison with the data and so can be stored on a flash plug which can be stored in a safe. Communication between client and server, often carried out over the internet, can be entirely in terms of the code numbers and so the method also protects against any compromised security of the communication system.

A coding table, which we will call the key, for a large database comprised, for example, of documents, may contain as many as 10 million coded data components. If the average length of a data component is assumed to be 10 two-byte characters, the space needed for the key, uncompressed is 200 MB, easily storable on a flash disk. Of course the key can be stored encrypted and compressed using standard encryption and compression methods.

Transactions and Search Methods

The use of whole number codes has many applications. We describe an application to the storage of data and the searching of a database. By a database we mean a collection of any data items, such as any document files, records or their joins, which in general we call items. These coding methods can be used in a traditional database, or in a TIE implementation, or in other faceted navigation implemented databases.

The use of whole number codes of data components allows us to perform all editing, searching and other transactions entirely in terms of the whole number codes. It is only when a user wishes to see any of the data components that a conversion from whole number codes to data components is made. The number of data components that are decoded at one time, for display to the user, is therefore limited to those that can be usefully examined at one time. This number is quite small which means that their lookup can be very fast, even if the necessary indexes are stored on disk.

For optimum lookup speed, a single index table, during initialization of a client, can be converted to two tables. One, the forward table, can provide a fast lookup of a text data component to obtain its whole number code, and can be stored as a hash table, keyed on the data component, or a reference to it. This is used when a new entry is made, during the coding of data, when new data is added, and when a user enters search terms. The other, called the reverse table, can provide a fast lookup of a whole number code to obtain the data component. That can be stored as an array of text data components, where the array index is the ID of the data component. Such an array can be disk based, or stored in RAM.

For fast location of data component IDs, the forward table can be kept in RAM or on disk. In this forward table, a data component (or a reference to it) can be the hash key and the value can be the ID assigned to that data component. Each added data component can be checked for its presence in the forward table. If it is already present then its ID can be used. If it is not present then the next available ID is used and the new entry is added to both the forward and the reverse tables.

It is often desirable to convert every data component of each data item to a number code. All coded data can then be stored in any convenient location with assurance of security. When data is to be retrieved, the reverse table can be used to convert each whole number code to a representation suitable for transmitting to a calling program or presenting to a user. Without access to this coding table, the meaning of the stored whole number codes can be unavailable and so storage of such coded data need not be secure.

An alternative to coding every data component is to not code certain components, or certain data items. For example the punctuation marks and special symbols, such as : ; . %, $, !, ?, and other symbols can be used without being coded. However when high security is needed, this approach might provide certain clues to a code breaker, no matter how weak those clues may be. Security can be further enhanced if all field names are also coded.

An additional advantage of coding every data component is that the data storage is easier. So for example data stored using the number codes requires some separator between the numbers, such as a space, or comma and any space or comma needed in the data can require an additional space. This makes parsing of the coded data more awkward. So it is easier if a literal space in the data can be represented using a number code. Similarly, if a comma is needed it can be coded. We can then store the data using any character (except a digit of course) as the separator between number codes.

The client-server architecture can be arranged in such a way that the server performs all its tasks on the data using only the number codes, while everything the client uses to display to the user, or to use in calculations, is on the client's computer, in the translated data component form, using the reverse table. Without compromising data security, the coding table (both forward and reverse) can be in the same location as the client, even when the server is at some remote and less secure location.

Using this system, data storage services can be provided "in the Cloud" e.g. at one or more remote locations accessible over the Internet, with assurance that even the provider of such a service will not be able to see the real data. Some of those providing such services can also provide tools for searching through the data, without any of the real data being revealed to the provider, or to anyone having access to the service without the key.

Offering such remote data storage services can be implemented by providing the user a web location to obtain a download of the coding software application, referred to here as the Coder. Such a Coder can then allow the user to choose which data sets they want to store remotely. The coder can analyze the data on customers' secure computers, creating the coding table and a coded copy of the data. It can then upload to the remote location the coded data.

When a user desires to perform a transaction or to search, the necessary software tools can be provided from the remote site. To perform any action on the remote data, the coding table can be required on the client side. That coding table, as already explained can be used to convert any entered data components into codes and any codes returned by the server into data components.

Figure 2:
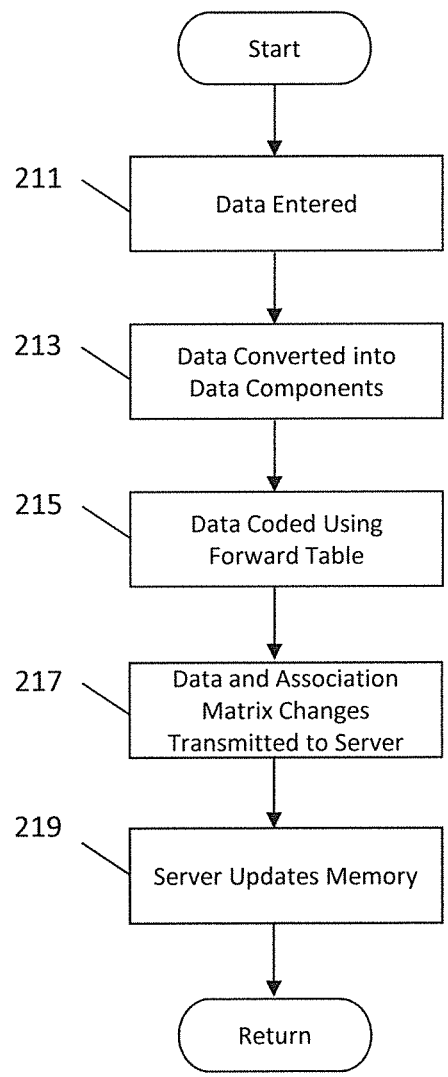
FIG. 2 is a flow diagram of a process in accordance with aspects of the invention.

The following are examples of how various client controlled processes can work. In a first example, discussed with respect to FIG. 2, data is added. In a second example, discussed with respect to FIG. 3, data is searched. In some embodiments the process of FIGS. 2 and 3 may be performed by a client computer in communication with a server, which may also perform portions of the process.

Transactions

A user enters new data in block 211. The data may be entered into a client computer, for example.

1. The entered data is converted into data components in block 213, for example by the client computer.
2. The data components are coded using the forward table in block 215, for example by the client computer. Those data components already assigned number codes use those codes. New data components are assigned new number codes, in sequence in some embodiments, which are added to the reverse table and the forward table. Their effect on the association matrix is also updated.
3. The new data and any changes to the association matrix are sent to the server using codes in place of each data component in block 217.
4. The server updates its matrix and anything else affected by the added data in block 219.

Searches

A user inputs a search in block 311. The search terms of the search may be entered into a client computer, for example.

1. If user inputs a data component, the entry is checked using the forward table in block 313, for example by the client computer, to make sure it matches one of the data components. Matches can be checked after each character is added to the search input, or after the input is completed. Auto-completion can be used if needed. When or if the user chooses a data item from those presented, its number code can be directly associated with the presented and chosen data item. User inputs that do not match any of the data components can be rejected, implicitly, by not accepting the typed mismatched characters, or explicitly by notifying the user, or both.
2. The data components in the query are converted to number codes from the forward table in block 315, for example by the client computer.
3. The query, comprised of number codes and when necessary (or in some embodiments when appropriate), Boolean operators, is sent to the server for evaluation in block 317. For added security, Boolean operators can also be coded.
4. The server responds using number codes and item identifiers which may also be in terms of number codes, and the client computer receives the response in block 319.
5. In the response, the client computer converts the number codes of elements, used for presentation to the user, to their corresponding data components, using the reverse table in block 321 and presents the response to the user in block 323.
6. If the user requests to view found items, the item codes are converted to item references, which often comprise file location and offsets into the file, and the requested data items are presented to the user.

The searches on the server can be made very fast by creating an association table as an array of data component vectors, each vector is identified by the table row number which is the number code of the corresponding data component. The data component vector's components are the identifiers of all data items containing that data component or described by it. Boolean queries comprised of data component codes can then be easily and efficiently evaluated as unions, intersections, or complements of the sets of data item components of the relevant data component vectors.

The server and client arrangement, in various embodiments, can be any functioning database system which can be setup to manage whole number codes instead of the uncoded data components. There is generally no reason why any data management system would not be able to use number codes in place of data components. Generally, the only time that these number codes need translating to the corresponding data components, is when the results need to be presented to another application, to a user, or the specific values of the data components are needed. In essence, after the conversion to number codes, the coded data can be stored in any database and searched in any available way.

When calculations are to be performed on the server side and these involve the values of the data components, the calculations can be performed on the client where decoding is possible. If the calculations are to be performed on the server because they are part of the query and so determine which items match the query, they can in most cases still be performed on the client as follows.

Suppose the query comprises any condition C(S) involving a set of data components S. Then the query can be evaluated with the condition requiring evaluation replaced by the requirement that all data components needed for the calculation are present in every data item. In addition the query response can require the list of identifiers of all the data entities in the set S. The client can then be able to apply the condition C(S) and then send a modified query to the server using the results of the evaluation. The evaluation can limit the set S of data components to only those that satisfied the criterion C(S) and the modified query can use that to determine the matching items. For most types of C(S) however the modified query is not even necessary and a much simpler method can be used.

For example, suppose in a healthcare database C(S) is the condition to find all encounters in which the patient is in a specified age range and had specified symptoms. The client has all the field values as part of the key, so it has all the ages in the age fields of all the records. Therefore the client can create a coded query, with the actual ages that meet the specified range, in a parenthesized disjunctive subset with a conjunctive of the specified symptoms.

Methods Of Query Execution

When a relational database is used, the database's query execution can be used. However, when using number codes for all data components, it is much more efficient to take advantage of this and use more optimal methods for query execution. One such method creates association matrices storing the association of each record with its field values. When the field values are all whole numbers, these can be used in a table as the row number, while the column number can represent the ID of a record. This table we refer to as the matrix. Its two common implementations are as an array of vectors, where each vector is an array of bits or an array of ID numbers of the non-zero bits.

Using the associative matrices, the methods of executing queries can be optimized as follows. We usually store each row of an association matrix as an array of vectors whose components are the column numbers of the non-zero cells in the corresponding bit vector. Assuming the use of 32 bit IDs, storing a matrix as a bitmap is more compact only when the matrix is more dense than one in 32 non-zero bits. However, when executing a query it is often more performance optimal to convert the vectors being used in the query evaluation process to bit vectors. The following explains one optimal set of method steps.

1. A query typically consists of a set of data components and a set of Boolean operators. The evaluation of such Booleans, in the simplest cases, involves unions and intersections of vector components of data component vectors, each component is an ID of a record. So that for example the conjunctive Boolean between data component A and data component B is evaluated and the vector components of the result vector C are the IDs of the matching items.

2. The result vector is then conjoined (or disjoined) with the next data component vector, if any, in the Boolean and the process proceeds in that way.

Next we describe some optimal methods of evaluating the conjunction and the disjunction between two vectors.

Vector Conjunctions and Disjunctions

When the two vectors have components which are sorted indexes of the non-zero bits in the corresponding bit vector form, the common method of evaluating their conjunction or disjunction is the well-known zig-zag method. However we describe here a method that is faster in performance and does not require the vector components to be sorted.

Conjunctions

Figure 4:
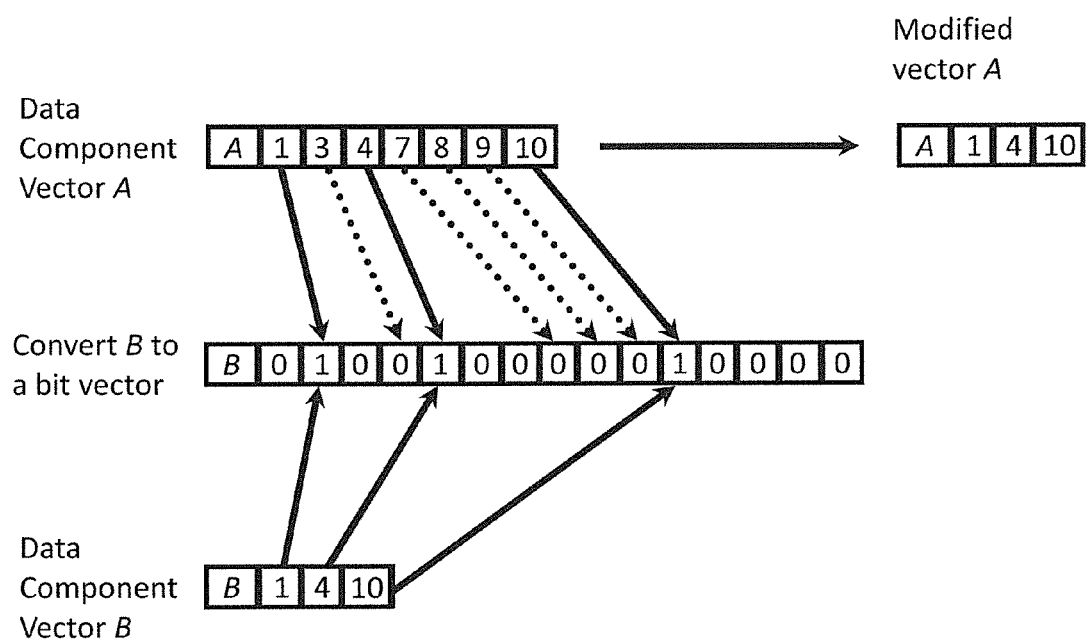
FIG. 4 illustrates aspects of a further process in accordance with aspects of the invention.
Figure 5:
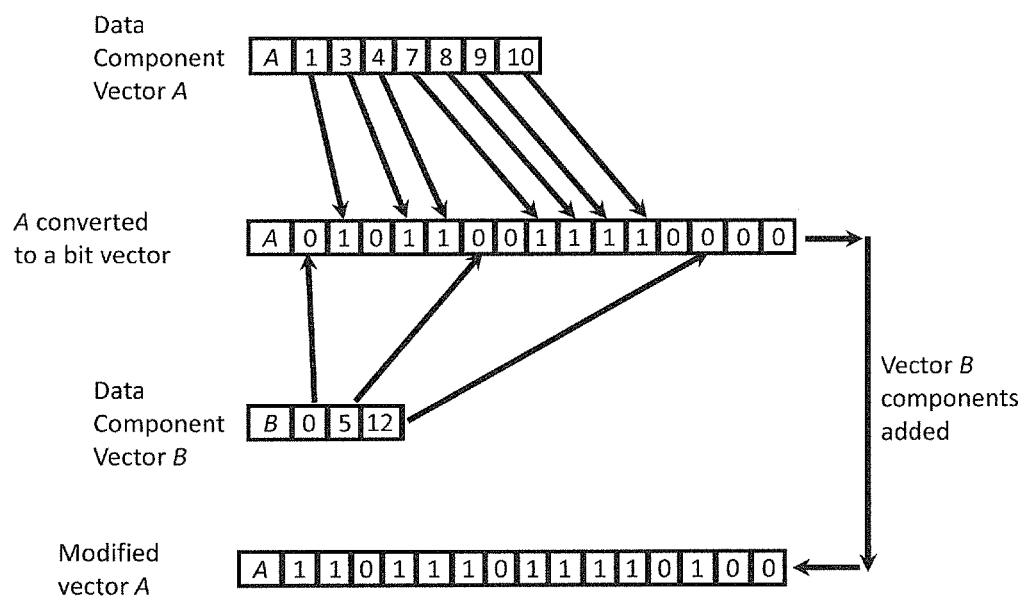
FIG. 5 illustrates aspects of a still further process in accordance with aspects of the invention.

Let the two vectors to be conjunctively combined be A and B both represented in ID component form. The process is described in terms of A and B but both these are replaced after each step in an iterative process. The process, an example of which is shown in FIG. 4, in illustrative form for a single B vector, is as follows:

1. Assign a first data component vector (or more generally query result vector) to be vector A and a next data component vector to be vector B;
2. Convert B to a bit vector by using each component ID of the ID vector to address the corresponding bit index of a bit vector and setting it to 1;
3. Iterate through the ID components of vector A using each vector component as the index into the bit vector and if that bit component is not a 1, remove the component from vector A;
4. The modified or temporary result vector A is then used with the next vector assigned to B, to be conjoined with vector A and the process repeated from step 2 until all conjunctions are completed.
5. The resulting modified vector A is the result vector, whose components are the IDs of the matching items.

Usually the conjunctions of only a small number of data components are needed. After every additional conjoined data components the number of vector components of the resulting vector gets smaller, therefore the zig-zag method can be quite satisfactory in performance. However when the number of data components to be conjoined is large, the method described can improve the performance considerably.

Disjunctions

Figure 3:
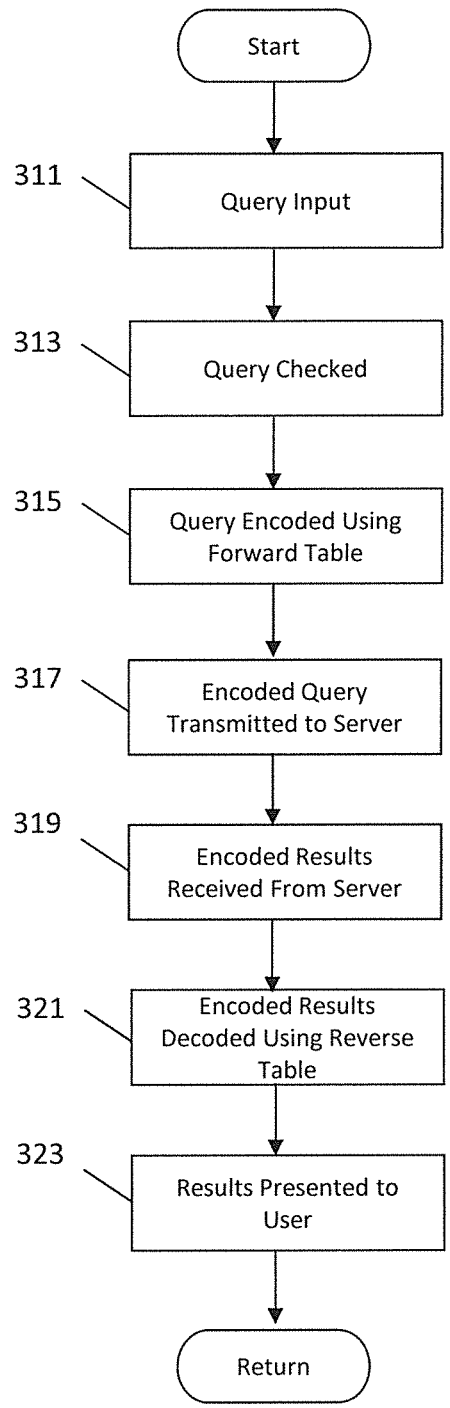
FIG. 3 is a flow diagram of a process in accordance with aspects of the invention.

A similar method is used to evaluate the disjunction of a set of vectors. The optimized process for the disjunction of two vectors A and B, an example of which is illustrated in FIG. 3, is as follows:

1. Assign a first data component vector to vector A and a next vector to vector B;
2. Convert A to a bit vector by using each component ID of the ID vector to address the corresponding bit index of the bit vector and setting it to 1;
3. Iterate through the ID components of vector B using each component as the index of the A bit vector and setting it to 1;
4. Modified bit vector A is then used as the result vector and disjunctively combined with the next vector assigned to B and the process repeated from step 3 until all disjunctions are completed.
5. The resulting modified vector A is the result vector, whose component bits designate the IDs of the union set of the components of all the disjoined vectors.

Finally we describe the counting process, the steps that result in the counts of all items associated with each data component. These counts we call frequencies.

Once the set of matching items is determined, the items-to-data component matrix may be used to determine the frequencies. The process steps are very similar to the disjunction steps just described, but instead of using a bit vector for the output vector (vector A) we use an array of counts vector (more simply referred to as the counting vector) for vector A. This can be an array of integers, each integer large enough to store the largest count of items and the size of the array sufficiently long to store the counts of associated items with all the data components whose frequencies are needed. Each array index is made the ID of a data component, which allows the addressing of each counting element just like addressing the bit of each bit vector. The steps are the following:

1. Create the counting vector array A, initialize it to an appropriate size and set all counts to zero;
2. Use the components of the next item vector as indexes into the counting array and at each addressed index increment the count;
3. Repeat step 2 until all item vectors matched by the current query have been processed;
4. The resulting counting vector A contains the counts of the matching items associated with every data component. Those with zero counts can be made unavailable for conjunctive additions to queries.

Additional Data Security

Words, under any convenient definition of the meaning of "word" are the most common data components. Assigning consecutive whole number codes to words and various additional symbols (such as currency signs, percent signs, punctuation marks, etc) in some systematic order can provide some clues to a very determined adversary intending to break through the coding. One way to make that more difficult is to assign consecutive whole number codes to a randomized ordering of the data components. This can make it impractically difficult to discover the coding. However, a further step can be taken to make it even more difficult to break the coding.

If adversaries know the nature of the data, they may be able to analyze the usage frequency of the codes and compare them with the usage frequency of words in similar data. To foil any such attempts, the true usage frequency of the codes can be disguised by using multiple different whole number codes for each of the more frequently used words, phrases or other frequent data components. A different whole number code of several uses of such frequent words, can then be used for each instance of the word in any data passed to or from the server, or for any data resident on the server.

The following is one way of achieving such a frequency disguise. Sort the complete unique word vocabulary by the frequency of each word's use within the database. Then each word with the highest frequency can be assigned the largest number of different whole number codes, while the ones in the lower frequency groups can be assigned a smaller number of whole number codes. To even out the frequency of occurrence the number of codes to be assigned to a frequent data component can be made approximately proportional to that component's frequency of occurrence in the data.

Table 3 is an example table of a small sample of relatively few words, their average occurrence frequencies per item and a possible choice for the number of whole number codes to be assigned to each.

TABLE 3

| Frequencies per document | Relative frequencies | Number of IDs to be assigned | Word |
|---|---|---|---|
| 922 | 15.9 | 16 | Of |
| 842 | 14.5 | 15 | the |
| 518 | 8.9 | 9 | and |
| 364 | 6.3 | 6 | in |
| 345 | 5.9 | 6 | is |
| 337 | 5.8 | 6 | a |
| 337 | 5.8 | 6 | to |
| 235 | 4.1 | 4 | that |
| 161 | 2.8 | 3 | are |
| 158 | 2.7 | 3 | p |
| 149 | 2.6 | 3 | as |
| 113 | 1.9 | 2 | be |
| 112 | 1.9 | 2 | with |
| 111 | 1.9 | 2 | memes |
| 108 | 1.9 | 2 | this |
| 100 | 1.7 | 2 | for |
| 97 | 1.7 | 2 | or |
| 95 | 1.6 | 2 | can |
| 92 | 1.6 | 2 | by |
| 86 | 1.5 | 1 | one |
| 78 | 1.3 | 1 | it |
| 71 | 1.2 | 1 | we |
| 70 | 1.2 | 1 | which |
| 69 | 1.2 | 1 | knowledge |
| 67 | 1.2 | 1 | an |
| 65 | 1.1 | 1 | information |
| 64 | 1.1 | 1 | cultural |
| 58 | 1 | 1 | on |

In this example, the remaining words occurring less frequently than the last word listed in the table can be assigned single whole number codes.

Almost any number of IDs assigned to the frequently occurring words, or in general data components, will distort the actual frequency of occurrence and this may provide sufficient security.

Example Application for Data Storage

One possible application of these methods is to provide a web based service of secure data storage, access and analysis. The following describes one possible implementation of such a service.

1. A web based computer, or a virtual computer, referred to as a remote computer, houses a data server, accessible over the Internet.
2. A user contracts to use the service and store their data on the remote computer
3. The user contracts to be able to:
   3.1. use the data server on the remote computer to house and maintain the data.
   3.2. provide access to the data to download data records when needed, and optionally provide data analysis and data search capabilities.
4. The server, or a special application, downloads a coding application, called the coder, to the client computer.
5. The coder enables a user to choose the data to be coded and housed on the remote computer.
6. The coder processes the designated data, creates the forward table and reverse table.
7. The coder codes the data components in each data item and optionally assigns an item name, an item unique identifier, an item location reference, and creates an item identification table.
8. The coder sends the coded data items, such as records or documents, to the data server in the remote location, in which all the data components of the data items are replaced by the corresponding number codes.
9. To minimize search times, the server may create an association matrix, storing the association between each code of a data component and each identifier of the item containing it.
10. The server may also create other useful indexes.

The server can be any database server, including a relational database server, a TIE, or any server implementing a faceted navigation type search system. The client can be any client able to communicate with the server and able to handle the translation of codes.

An alternative system can store the uncoded data on the client computer, identifying each item with a code, a location reference, and coding each data component as in the previous alternative. The data itself need not be coded (although it can be coded) and can reside entirely on the client computer or on the local area network. This arrangement can require less data transfer from client to remote server, while allowing the remote server to perform all searches and analysis.

Methods of Coding Data Components

A preferred embodiment can code every word in the data, including words in the field names and table names. Here by "words" we mean a sequence of alphanumeric characters starting at start of text or following a designated non-alphanumeric character (word breaking character) and ending at end of text or at a designated non-alphanumeric character (word breaking character). The word breaking characters can be chosen differently in different situations, as desired. The word breaking character here includes the possibility of a plural set of characters. Thus, for example a domain name, such as uspto.gov can consider the period as a word breaking character and apply coding to uspto and gov as two separate words. In certain situations it can be convenient to code both individual words and combinations of these as phrases.

Sometimes it may be convenient to have two different coding tables, one for data storage (Data Coding Table) the other for searches (Search Coding Table). Then the forward Search Coding Table can code sets of synonyms of a word as the same code, allowing searches using a synonym to succeed, while the reverse coding table would not be needed for searching. This means that when a user enters any one of the synonyms, the same code can be used to search the data. The reverse coding table may only be needed for decoding the data in the data items, which can necessarily give only one data component, the literal one, for each code.

To allow the user to choose a synonym search or a literal search, the forward coding table can in fact be two coding tables (or one coding table but with two entries for each word having a synonym): one can allow only literal coding of data components, while the other can allow synonymous coding.

The synonym codes can be associated with every item containing any of the synonyms while the literal codes can be associated only with items which contain the literal data component.

When creating the Data Coding Table for item content and encountering portions which are binary, the content can be split into some reasonable length data components, such as 10 character substrings. When creating a Search Coding Table in these cases, the coded data may need to be parsed into text or other useful data components before being coded.

Dealing with More Complex Data

The reverse code table, which acts as a key to the coded data, can be stored very compactly as long as it does not contain a great number of large data components. For example, if all the data is textual and the chosen data components do not comprise a large number of very long text strings, the reverse table stored on disk will be quite small, on the order of 100 MB. If however the data includes a very large number of pictures and/or large movies, and/or large numbers of very long text strings, the size of the reverse table can become large, its size dominated by the cumulative size of the long strings and graphics. In those databases where such large data is present, the data items, or just the very large data items, can be replaced in the reverse table by references, which specify the location of these data items. Such data items may then need to be stored on the local area network and if security is needed, in a secure protected location. Alternatively they can be stored remotely, but coded in any convenient manner. For example, pictures and movies can be coded as binary files, with each group of binary components coded as a number and entered into the item coding table.

The case of formatted documents forming part or all of the data may be treated similarly to binary data. Alternatively formatted text data can be completely coded using any number of similar methods. For example, the formatted document may be converted to an xml format, which clearly delimits textual content from the formatting. The current trend in fact is to use xml formats for all documents. For those, conversion may not be necessary. For others, it might be advisable to convert valuable legacy documents to xml so they remain accessible for a long time.

Such xml formatted documents can then treat the xml formatting tags as data components, distinguished in any convenient way, from the text content data components. Searches on both the textual content and the formatting can use the formatting tags.

Aggregated Use of Multiple Servers

The number coding system can be used very effectively to search and access multiple databases using just one client and an aggregating server.

Assume that N servers, termed slave servers, each serving its own database using its own whole number Coding system, referred to as local codes, are installed. An aggregating server is also installed and configured to serve any number of clients and to communicate with each of the slave servers. Each client can use a coordinated set of number codes, referred to as the global codes, to represent the query to the aggregating server. The global codes can check each local code's data component and assign to it a suitable code. If the same data component is in two or more local codes one global code can replace it. If some or all of the slave data sets contain the same kind of data, we can expect that there can be many same data components amongst two or more local codes.

Each slave server, or pre-processing application, can create the respective local codes for all its data components. Several ways can be used to communicate securely between the aggregating server and the slave servers.

One possible method, called the single code set method, creates the union set of all the slave server sets of data components and codes them using one set of codes defined by a single pair (i.e. forward and reverse) of code tables. To be able to use just one pair of code tables for all slave servers, each slave server's association matrices can be converted from the local codes to the equivalent global codes. For this conversion, a translation table for each slave server's codes can be created and used in the conversion.

For optimum performance in the translation process, each local to global translation table can be implemented as an array of code numbers, where each array element's index is the local code number of the data component and the element's value is the global code of the same data component. This can provide the fastest lookup performance during the conversion process.

Another method, called the local-to-global aggregation method, can require the conversion of codes from local to global and the reverse, to be performed in real time by the aggregating server. For optimum performance, this can require two conversion tables for each slave server: one using array indexes for the local codes and the other using array indexes for the global codes.

Assuming the local-to-global aggregation method, the aggregating server performs the following basic functions:
1. receives a query from a client, expressed in terms of the global codes;
2. translates the global codes used in the query to N queries, one for each corresponding slave server, using the global-to-local conversion tables;
3. sends each translated copy of the query to the corresponding slave server;
4. receives the response from each slave server in terms of its local codes;
5. converts the response from each slave server to use the global codes;
6. aggregates the converted responses into one response by creating a union of the response codes for each part of the query;
7. sends the aggregated response to the client.

When using the single code set method, step 2 of the above steps becomes unnecessary.

Data items can be similarly handled, except that it may be easier to create global coding even before creating the association matrices. For example, each slave server, or other local application can determine the total number of local data items. Then each slave server, or the coding application can be assigned a sufficient range of number codes to accommodate all data items. In that way translation from local to global and back would not be necessary.

The response to a query includes the unique identifiers of the matching items (item IDs). Matching item IDs are passed from a slave server to the aggregating server. Similarly, in order for a client to decode the coded content of data items, it should have the necessary code table. Therefore item IDs passed to the aggregating server and passed by the aggregating server to the client as part of the response to the query, should be able to determine to which slave database each item belongs. This slave data information can be number coded, or coded in any other convenient way. If it is number coded and if the single code set method is used for data item codes, then the range in which the code number lies can determine which local slave server can locate the item.

The aggregating server can be in any location, either in the same location as the client or in some remote location. Because it is dealing only with numbers, security is reasonably assured.

After that, each separate data set can maintain its currency, following transactions, locally by adding codes to new data and possibly, though not necessarily, deleting obsolete data codes. To make the transactions available to all users of the aggregated data, either the aggregating server's conversion tables is updated, or the single code set is updated and securely transmitted to each client, after an update of any slave server data. For secure data, this update should be performed at a location secure from break in.

During any transactions of data, supported by a slave server, that slave server's forward and reverse tables may need to be updated. Updating these tables will generally only be necessary if new whole number codes are created during the transactions. These new codes will only be needed when added data requires new data components not already coded with number codes. Secure transmission of the meaning of new codes can use individual character codes for security.

When a transaction involves the deletion of a data component, and there is no data remaining in the database which contains that data component, the number code assigned to that data component becomes available for other data components and can be re-used. Alternatively it can be retained in case the same data component is added in a future transaction.

When new codes of data components are added to a slave server, the aggregating server should be updated. The following describes a possible method of creating the aggregating server conversion tables.

The metadata associated with each slave server comprises the forward and reverse tables. We refer to these as the slave tables. One embodiment of the invention assigns codes in a slave table independently of those in another slave table. Such tables are termed uncoordinated tables.

In another embodiment of the invention, all of the slave tables are coordinated. This means that the same data components have the same codes in all slave tables. In another embodiment of the invention, not all but a plurality of slave tables are coordinated. In this embodiment some slave tables are coordinated while others are uncoordinated. These tables are called the partially coordinated tables.

Coordinated tables allow a more efficient aggregation process. However creating a coordinated set of slave tables requires more effort and in some circumstances may not be practical.

Using a coordinated set of slave tables the aggregating server need only send, to each slave server, copies of the query received from the client and then aggregate the responses and send them back to the client.

There are other possible methods of using parallel servers to have those servers process queries from a client. For example, it is possible to use the text version of the data components between the client and a securely located aggregating server. Then at the aggregating server's site convert the query comprised of data components to each slave server's codes and send it to each slave server using the appropriate codes.

The following is an example of methods that can be used to create the conversion tables allowing quick conversion of the slave codes to coordinated codes and vice versa. For fastest lookup of codes in each direction two sets of translation tables can be used. One set, consisting of one table per slave server, or a combined table, for quick translation of a coordinated code to the associated slave codes. The other set consisting of one table per slave server, for the reverse lookup, for quick translation of an uncoordinated code from a slave server to the coordinated one. One very efficient implementation of each such table is an array, where the array element index, or a simple offset of the index, is the code number being looked up.

TABLE 4

| Data Component | UID Slave 1 | UID Slave 2 | UID Slave 3 |
|---|---|---|---|
| blue | 12 | 34 | 1 |
| yellow | 11 | 30 | 9 |
| violet | 9 | 12 | 40 |
| green | 15 | 44 | 6 |

TABLE 5

| Data Component | Array index = coordinated ID | Slave 1 ID | Slave 2 ID | Slave 3 ID |
|---|---|---|---|---|
| yellow | 1 | 11 | 30 | 9 |
| green | 2 | 15 | 44 | 6 |
| blue | 3 | 12 | 34 | 1 |
| violet | 4 | 9 | 12 | 40 |

Given a set of uncoordinated tables (UT) one method of creating conversion table (CT) is as follows. Preferably, though not necessarily, start with the longest uncoordinated forward table (UFT) (that is, the table for quick lookup given the data component) to determine its uncoordinated ID (UID). This table can be stored in an associative array, that is a hash table, where the hash key is the data component and the value associated with that hash key is the UID. This starting table and its reverse, the uncoordinated reverse table (URT) will then be the source of the starting entries, contributed by each slave server data, to the coordinated table (CT). The entries in the other uncoordinated tables are then added, one at a time, to the coordinated table using any coordinated codes already assigned to a data component and adding sequential code numbers to any data component not yet assigned a coordinated code.

Both the forward and reverse tables can be used to make the aggregation process as fast as possible in both directions. Each kind of table can be implemented as an array where the index of the array element is the ID to be looked up. The forward table can be an array of data component vectors where the index of the array identifies the ID of the data component and that vector's components are the IDs of that data component as used on each of the respective slave servers. Table 5 illustrates such a structure where each row is a vector and the first cell in each vector is the array index which is the ID of the coordinated data component.

For example, the aggregating server receives a query, using data component IDs, from a client which uses only coordinated IDs. It uses the forward table in which the row number is the coordinated ID, CID, and the values in the row (that is, components of the respective vector) are the respective slave server local IDs. Thus the aggregating server uses the several local IDs and converts the query into the several separate local queries.

The nature of the response of the slave servers to a query depends on the type of implementation and type of databases used. If a normal relational database system is used, the response to the query is a list of IDs of the matching items. These IDs can be coordinated between the servers (for example, by assigning a range of IDs for each local sever to use) or they can use independent uncoordinated IDs for the items and then the aggregating server will need to convert these IDs to the coordinated set and return the result to the client.

If the databases use faceted navigation, such as the TIE database, then the aggregating server has the task of translating and uniting the list of available data components returned by each server. The available data components are those which are associated with any one of the matching items.

Overview of Client-Server Number Coded Process

The details of the system organization for security of the data depend on the specifics of the application and the environment. The following example outlines some general features and parts.

Number Coded Secure Data

In this the following applies:
1. All data is coded.
2. The client computer is secure from intrusion.
3. The coding key is stored on a small flash plug which can be stored in a safe when not in use.
4. The flash plug with the coding key is plugged into the client computer to enable access to the server and data.
5. The coding key can be zipped and passworded.
6. When a number of databases are in an organization, each will have its coding key and each coding key can be identified by a unique number, associating it with the database which uses it. That association, which can be hidden from any intruder, provides an additional safety layer.

The number coding secure system has the following parts:
1. Server which uses only the number codes.
2. The Coder which:
    2.1. Creates the assignment of numbers to elements of data.
    2.2. Codes each field value in each record in the data and each field name.
    2.3. Creates the new coded records, allowing the originals to be moved to a secure place as backups.
    2.4. Compresses and passwords the coding key and outputs it to a flash drive.
3. The Code Interpreter which uses the key and:
    3.1. Converts all queries from their textual to their coded form.
    3.2. Converts all responses from the server to their text form for the client to display.
    3.3. Converts any data records requested by the user from their coded form to their text form.

The Code Interpreter in many cases can be integrated into the client code. The Coder is usually best created as a separate application.

The above steps are preferred whether a GIA client and server are used or the steps are implemented as an add-on to a relational database.

Although the invention has been discussed with respect to various embodiments, it should be recognized that the invention comprises the novel and non-obvious claims supported by this disclosure.

What is claimed is:

1. A computer implemented method of providing secure data storage, for data comprised of data items which are comprised of data components, a plurality of the data components being comprised of a plurality of text characters, the method comprising:
    coding at least all data components needing secure storage such that each unique data component of the plurality of data components is assigned a unique code unrelated to semantic meaning of the unique data component;
    storing the data items using the coded data components;
    ensuring that decoding of a particular coded data component is not needed to search for the particular coded data component;
    ensuring that to replace each coded data component with a corresponding data component requires a table with at least as many code entries as there are codes assigned, wherein each code is a number;
    creating a code table storing the coded data components' codes;
    creating an association matrix storing associations of data items with the numbers for the codes of the data components;
    wherein a specific whole number code for a code of a specific data component in the code table is arithmetically related to a table row number which contains the specific data component.

2. The method of claim 1 wherein the numbers for the codes are sequential numbers.

3. The method of claim 1 wherein a majority of the coded data components are comprised of a plurality of text characters.

4. The method of claim 1 wherein the code table comprises a list of data components and wherein the number for the code of each data component is a list item number.

5. The method of claim 1 wherein the code table is implemented in a software program as an array of vectors.

6. The method of claim 1 further comprising performing coding of the data components on a client.

7. The method of claim 6 further comprising transferring the codes for the data components to a server.

* * * * *